(12) United States Patent
Liguori et al.

(10) Patent No.: US 11,429,353 B1
(45) Date of Patent: Aug. 30, 2022

(54) DYNAMIC SERVICE PROVISIONING USING TEMPLATIZED INFRASTRUCTURE RESOURCES

(71) Applicant: Amazon Technologies, Inc., Seattle, WA (US)

(72) Inventors: Clare E Liguori, Bainbridge Island, WA (US); Suresh Kumar Venkatachalam, Scarsdale, NY (US); Roy Kachouh, Santa Monica, CA (US); Rafael Alvarez Vallina, Bainbridge Island, WA (US); Adnan Khan, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 17/116,860

(22) Filed: Dec. 9, 2020

(51) Int. Cl.
*G06F 9/54* (2006.01)
*G06F 8/30* (2018.01)
*G06F 11/34* (2006.01)

(52) U.S. Cl.
CPC ............... *G06F 8/311* (2013.01); *G06F 9/54* (2013.01); *G06F 11/3409* (2013.01)

(58) Field of Classification Search
CPC ....................................................... G06F 9/54
See application file for complete search history.

(56) References Cited

U.S. PATENT DOCUMENTS

| | | | |
|---|---|---|---|
| 7,503,032 B2* | 3/2009 | Bhaskaran | G06Q 10/06 705/348 |
| 8,365,138 B2* | 1/2013 | Iborra | G06F 16/2365 717/113 |
| 10,326,657 B1* | 6/2019 | A | H04L 41/0866 |
| 2009/0238078 A1* | 9/2009 | Robinson | G06Q 10/06 370/241 |
| 2010/0114618 A1* | 5/2010 | Wilcock | G06Q 10/06375 705/348 |
| 2015/0032752 A1* | 1/2015 | Greifeneder | G06F 16/285 707/738 |
| 2017/0357533 A1* | 12/2017 | Chaganti | G06F 16/93 |

* cited by examiner

*Primary Examiner* — Jae U Jeon
(74) *Attorney, Agent, or Firm* — Knobbe, Martens, Olson & Bear, LLP

(57) ABSTRACT

Features are disclosed for dynamically provisioning an application stack using a set of infrastructure resources. A computing device can receive an infrastructure template from an administrative device. Based on the infrastructure template, the computing device can determine a schema and an infrastructure as code. Using the schema, the computing device can receive a specification file from a developer device or an administrative device. The specification file can be a service specification file or an environment specification file. The computing device can inject the values of the specification file into the infrastructure as code. The computing device can use the injected infrastructure as code to generate and deploy the application stack to the developer device.

20 Claims, 6 Drawing Sheets

DYNAMIC SERVICE PROVISIONING USING TEMPLATIZED INFRASTRUCTURE RESOURCES

BACKGROUND

Computing devices can utilize applications to view, update, and/or exchange data, for example via a communication network. Applications are usually created by software developers, who utilize coding languages to create the application. A variety of types of applications exist. For example, a desktop application can include code executable by a traditional fully-fledged operating system (e.g., a desktop or a laptop), a mobile application can include code executable on a mobile device, and a web application can include code executable in a web browser (which itself is an application executing on a device). Application development, particularly of network-accessible services, is generally complex. Typically, such applications can include many modules, services, data stores, etc., that interoperate to provide the application. It takes a relatively high level of experience to coordinate all such components to provide a fully functional application. Further, in order to provide a complete experience, a group of applications and/or other separately-executable components may be grouped into an application stack that offers a set of particular features. In order to implement the application stack, the applications are provisioned via infrastructure that supports the features and functionality offered by the applications. Typically, the infrastructure includes the components necessary to manage the development and deployment of applications. For example, an infrastructure may include one or more servers, data storage, networks application monitors, logs, security services, etc. The infrastructure, therefore, enables the provision of the application.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
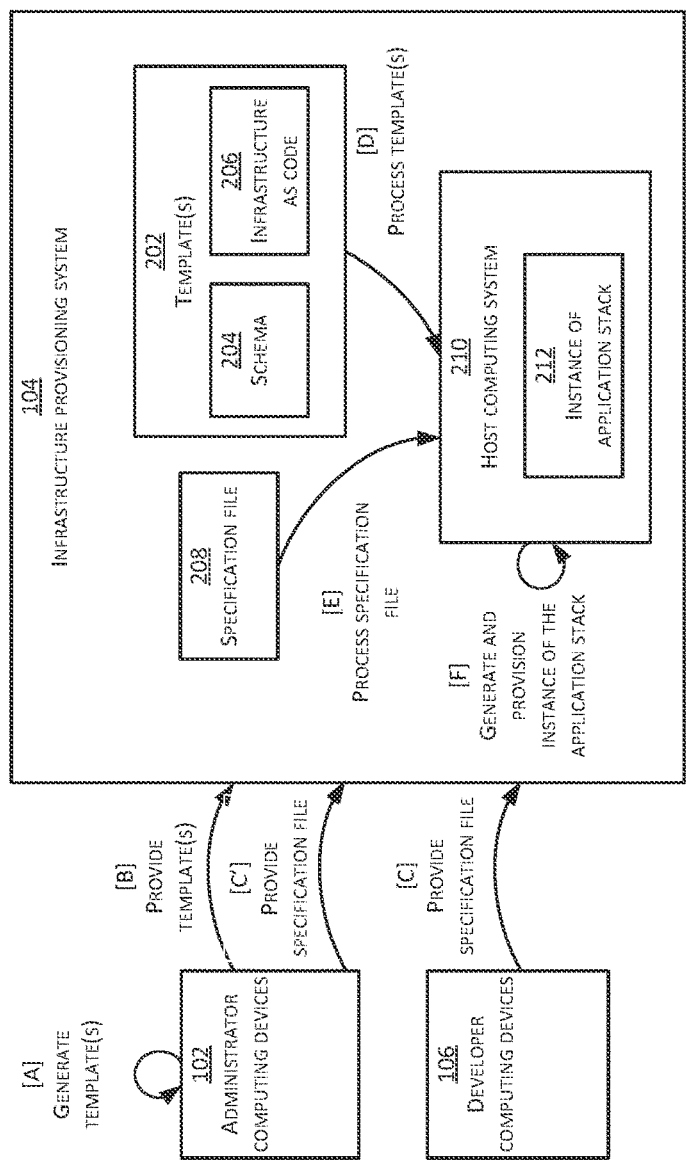
FIG. 1 depicts a schematic diagram of an example networked environment according to some embodiments.

The present disclosure generally relates to a managed application deployment service for container and serverless applications. Platform engineering teams can use the application deployment service to connect and coordinate all the different tools needed for infrastructure provisioning, code deployments, monitoring, and updates. Maintaining hundreds—or sometimes thousands—of microservices with constantly changing infrastructure resources and continuous integration/continuous delivery (CI/CD) configurations can be a challenging task for platform teams. The disclosed application deployment service addresses this challenge by giving platform teams the tools they need to manage this complexity and enforce consistent standards, while making it easy for developers to deploy their code using containers and serverless technologies.

Specifically, the present disclosure relates to the managed application deployment service provisioning and managing network infrastructure (including infrastructure resources such as block storage volumes, virtual machine instances, etc.) for computing services (including applications, microservices, etc.) being implemented on the network infrastructure. The provisioning and management of network infrastructure may be based on a multi-tier architecture that uses infrastructure templates and corresponding input schemas to define particular environments and computing services. Translation logic may be used to bring together the templates with input conforming to the corresponding schemas to generate infrastructure definitions from which instances of environments and computing services can be created. While developers may provide the input conforming to the corresponding schemas, the developers may be shielded by the templates and translation logic from the low-level infrastructure and implementation details. To further shield developers from low-level infrastructure and implementation details, the monitoring of the low-level infrastructure may be automatically aggregated, translated, or otherwise standardized for presentation to—and access by—developers. Moreover, the templates and/or translation logic may be modified to cause changes to the network infrastructure that is provisioned, in some cases without requiring additional or modified input by developers.

The network infrastructure resources may provide an environment for the execution and/or implementation of a computing service. For example, the network infrastructure resources may include a block storage volume and a virtual machine instance to implement an application. The block storage volume may act as a virtualized storage drive for the virtual machine ("VM") instance, enabling that VM instance to perform certain operations corresponding to the application, such as reading from and writing to the volume as if the volume were physically coupled to the instance. However, particularly in the context of cloud computing, the block storage volume may not be physically coupled to the host computing device physically hosting the instance. Instead, the block storage volume may be connected to the VM instance via a network, and another device (e.g., software executing on the host computing device) may facilitate interaction between the VM instance and the block storage volume such that the VM instance can treat the block storage volume as local. Moreover, rather than being a physical drive, the block storage volume may be a logical volume implemented on one or more underlying physical drives, which drives may vary among block storage volumes or even the same storage volume. Further, the block storage volume may be implemented according to a certain set of volume characteristics. For example, a block storage volume may have a particular volume type or a particular volume size. Therefore, different infrastructure resources with varying capabilities, characteristics, etc. can be provisioned for a particular application.

An application may be housed in a container provided by the network infrastructure. Further, the application may store data generated by and/or for the application in a database provided by the network infrastructure. Many applications can run using one or more computing "clusters," which can include at least one cluster master (which runs control processes including scheduling, resource control, handling application programming interface ("API") requests, and deciding what runs on the cluster's nodes) and multiple nodes (which are the worker machines that run containerized applications and other workloads). These clusters can run across a number of physical machines in a distributed computing environment such as a cloud provider network.

A developer may manage and modify the applications via a developer computing device. For example, a developer may provide an update to the application or may change certain functionality associated with the application. Further, the developer can package the application in a container image (e.g., a standalone, executable package of software that includes everything needed to run an application process) and send a request to the cloud provider network to execute the application in a cluster. In the request, the developer may indicate where the container image can be found, typically in an image repository within the cloud provider network or in a public image repository outside the cloud provider network.

A particular set of infrastructure may support any number of applications. The infrastructure may be provisioned with certain infrastructure characteristics or resources to satisfy requirements associated with a particular application. For example, a particular application may have particular hardware, software, or security requirements. Further, to satisfy the requirements of the application, the infrastructure may include hardware resources (e.g., block storage volumes, virtual machine instances, etc.), software resources (e.g., an operating system), network resources (e.g., a network), security resources (e.g., a firewall, a security group, etc.). The infrastructure may be provisioned by a cloud provider network in order to operate and/or manage information technology environments.

An administrator may manage and modify the infrastructure via an administrator computing device. For example, the administrator may specify certain configuration parameters that define the infrastructure in which the application is to be executed in a document or other file known as a schema. A schema may specify one or more characteristics for a given set of infrastructure (e.g., the amounts of memory, CPU, disk, networking resources; the inclusion and/or exclusion of certain classes of infrastructure; the security features; etc.) to be allocated to the applications. In order to generate the instructions and/or other data used provision the infrastructure, the administrator may determine an infrastructure template that defines the infrastructure resources that make up the infrastructure. In order to implement the infrastructure, the infrastructure template and developer specifications associated with the schema may be translated into infrastructure as software code (e.g., programmable infrastructure, software-defined infrastructure, etc.). For example, the administrator may codify the "infrastructure as code" in a particular format (e.g., YAML Ain't Markup Language ("YAML"), JavaScript Object Notation ("JSON"), eXtensible Markup Language ("XML"), etc.). Further, an administrator may provision monitoring tools (e.g., an alarm, a pipeline, etc.) that monitor the implementation of the application with respect to the infrastructure. Each monitoring tool may indicate characteristics (e.g., monitoring data) of the application implemented with respect to the infrastructure to the developer, such as monitoring data indicating a status (e.g., a health) of the application implemented for the infrastructure.

In conventional systems, in providing a set of infrastructure to implement an application, multiple users can interact to implement the infrastructure. Further, the infrastructure may include a plurality of infrastructure resources that may correspond to multiple infrastructure providers. For example, a first infrastructure resource may be a block storage volume that corresponds to a first provider and a second infrastructure resource may be virtual machine instance. While both the first infrastructure resource and the second infrastructure resource may be implemented in the same set of infrastructure, as the first infrastructure resource and the second infrastructure resources are associated with different providers, the developer may have to access or use separate tools in order to determine how the various infrastructure resources are performing. Further, while the administrator may provision monitoring tools to monitor the application, each monitoring tool may require that the developer separately access the respective tool in order to obtain the monitoring data. In order to group the respective tools together, the developer can manually combine the infrastructure resources together into a single or smaller number of interfaces or access points. However, such a manually tying together of the infrastructure resources can be arduous and may not be capable of being performed in a scalable and efficient manner. Further, such a manual solution may not account for new infrastructure resources with different formats and may require the developer to constantly update the infrastructure resources to tie them together.

As mentioned above, separate entities may manage the applications and manage the infrastructure. For example, an administrator may manage underlying infrastructure that is shared by multiple applications and/or multiple developers and a developer may write the application code for the application. Typically, developers are responsible for the operational performance of the application code and administrators are responsible for providing a platform for the execution of the application code. Further, developers are responsible for ensuring that the application corresponds to the infrastructure. For example, the developers are responsible for ensuring that the format of the inputs for the application match the input format of the infrastructure. This may provide an unequal or otherwise unsatisfactory experience for developers based on the particular infrastructure and the application being implemented for the particular infrastructure. For example, an application may receive multiple alarms based on the one or more monitoring tools and the developer may be required to login to each of the alarms in order to receive information about the application and/or the infrastructure. Further, the set of infrastructure resources may seem arbitrary or random. Such a difference in connections may lead to the developers having vastly different experiences than each other, and applications by the same developers may also have vastly different experiences. For example, modifications to a first application may have a fast implementation rate (e.g., the rate at which modifications are propagated to the first application) and the same modification to a second application may have a second slower implementation rate. Such a disparity in experiences between applications may be disadvantageous in certain situations. For example, when the first application is a game and the second application is a messaging application, it may not be desirable for continuous integration and continuous delivery and/or deployment ("CI/CD") for one application to have a superb experience while CI/CD for the other application has an inadequate experience. Further, the developer and/or the administrator may not be proactively capable of maintaining hundreds, thousands, etc. of application stacks with constantly changing infrastructure resources and monitoring resources.

Some aspects of this disclosure address the problems noted above, among others, by establishing a centralized view of the infrastructure resources that are provisioned for a particular computing service, such as a particular application stack. In order to implement the infrastructure for a given application stack, an infrastructure provisioning system may provision and deploy the application stack. The infrastructure provisioning system may implement a fully managed application deployment service for container and serverless applications. Further, the infrastructure provisioning system can connect and coordinate the tools needed for infrastructure provisioning, code deployments, monitoring, and updates. The infrastructure provisioning system can receive an infrastructure template from an administrator. The infrastructure template may indicate a set of infrastructure resources that make up the infrastructure, a schema for specifying particular parameters of the infrastructure, and an infrastructure as code file. The schema may indicate how data is received that defines the application stack implemented in the infrastructure. For example, the developer may provide a specification file that defines several inputs for the application stack. The specification file may be based on the schema such that the inputs of the specification file correspond to field values of the schema. Upon receiving the template (and associated schema) and the developer's specification, the infrastructure provisioning system may inject the specification into the infrastructure as code file. Further, based on the infrastructure as code file, the infrastructure provisioning system can generate the application stack and deploy the application stack. As the specification is injected into the infrastructure as code file, each of the set of infrastructure resources may be represented via the centralized view of the infrastructure resources.

Additional aspects of this disclosure relate to defining a fully integrated application stack as a curated stack. An administrator may provide various templates of application stacks for common use cases, (e.g., a web service application stack, a streaming service application stack, etc.). The administrator can make the template available to a group of developers for implementation. Further, the fully integrated nature of the application stack ensures that a developer will receive accurate information about the status of an application stack created using such a template, without regard to the specific implementation by the developer and without regarding the specific infrastructure upon which the application stack is implemented. Moreover, the developer is shielded from the specifics of the low-level infrastructure because the develop need only interact with the templatized schema, and does not need to have any involvement in the translation of the developer's specification and template into a specific format of infrastructure as code to be provisioned.

Further aspects of this disclosure relate to updating the infrastructure to be used for implementation of a given an application stack and generating updated instances of the application stack using the updated infrastructure. An administrator may change and/or update the definition of a given application stack infrastructure, such as by modifying the template, modifying the method by which the template and specification are translated into infrastructure as code, and/or modifying the underlying type or format of the infrastructure as code that is used to provision the infrastructure resources. The infrastructure provisioning system may identify one or more existing application stacks that correspond to the change and/or update. Further, the infrastructure provisioning system may proactively and automatically update the application stack to the most recent infrastructure definition. The infrastructure provisioning system may monitor the implementation of the update to the application stack such that if an error is encountered during the update, the infrastructure provisioning system can roll back the update.

Some aspects of this disclosure relate to monitoring the health of the application stack after deployment of the application stack. The infrastructure provisioning system may determine one or more monitoring resources (e.g., alerts, CI/CD pipelines) to monitor the plurality of infrastructure resources. Each of the monitoring resources may monitor a particular aspect of the application stack. Further, each of the monitoring resources may monitor a particular infrastructure resource of the plurality of infrastructure resources. As each of the monitoring resources may be a different type of monitoring resource, the format and/or the provider of the monitoring resources may also be different. The infrastructure provisioning system may receive the alerts from the monitoring resources and may determine a shared characteristic (e.g., a "least common denominator") of the monitoring resources and/or the alerts. Further, based on the shared characteristic, the infrastructure provisioning system may provide the alerts to the developers indicating a status of the infrastructure.

Various aspects of the disclosure will now be described with regard to certain examples and embodiments, which are intended to illustrate but not limit the disclosure. Although aspects of the embodiments described in the disclosure will focus, for the purpose of illustration, on a single application being implemented on a network infrastructure, one skilled in the art will appreciate that the techniques disclosed herein may be applied to any number of applications, microservices, or other computing services being implemented on the network infrastructure.

The disclosed managed application deployment service can be used to simplify the process of provisioning, deploying, and monitoring applications, such as applications built according to a microservices architecture. In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples, and different microservices of the same application can be deployed using different ones of these infrastructure options. The disclosed managed application deployment service can integrate containers, serverless functions, and other cloud resources into one centralized management tool, making it easier for developers to integrate different types of microservices into a cohesive application assemble a standardized stack of components to run the application.

FIG. 1 illustrates an example environment 100 in which one or more administrator computing devices 102 and one or more developer computing devices may be implemented according to some embodiments. The example environment 100 may include an infrastructure provisioning system 104 that exists within a particular network. The example environment 100 may include more, less, or different components.

The environment 100 can be or include a cloud provider network (sometimes referred to simply as a "cloud"), which refers to a pool of network-accessible computing resources (such as compute, storage, and networking resources, applications, and services), which may be virtualized or baremetal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a virtual private network (VPN) or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services (e.g., infrastructure), such as one or more of the routing devices, and which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The components of the example environment 100 may communicate over a network. The network illustratively represents a distinct network environment. In one embodiment, the network is a virtualized network logically implemented by a physical network referred to as the substrate, which includes physical network hardware such as routers, switches, network address translators (NATs), and so on, as well as the physical connections among the devices. For example, the network may represent a virtual private network environment ("VPE"). Generally described, a VPE can represent a virtualized computing network (hosted by a host device or multiple host devices on a physical network) that enables devices connected to (or "inside") the VPE to communicate as if connected to one another via a physical local area network ("LAN"). A VPE may in some instances be referred to as a virtual private cloud ("VPC"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network. In one specific, non-limiting embodiment, a network computing provider may comprise a plurality of physical network computing devices. The network computing provider may be configured to host a plurality of virtual network computing providers (VPEs/VPCs), each of the plurality of virtual network computing providers logically separated from each other virtual network computing provider of the plurality of virtual network computing providers.

The network environment 100 can logically include one or more administrator computing devices 102 and/or developer computing devices 106, which represent computing devices operating within—or in communication with—the cloud provider network or other network in which infrastructure resources are provisioned for computing services. The administrator computing devices 102 and/or the developer computing devices 106 may be physical devices, or logical devices implemented on underlying physical computing devices. For example, the administrator computing devices 102 and/or the developer computing devices 106 may represent virtualized devices provided by a hosted computing environment, which may also be referred to as a "cloud computing environment." Such an environment can include a number of dynamically provisioned and released computing resources.

The administrator computing devices 102 may be used by or otherwise correspond to an administrator persona or user, also referred to as an administrator account. In some embodiments, the administrator computing devices 102 may correspond to one or more of an infrastructure team, platform team, site reliability engineering ("SRE") team, DevOps team, or Cloud Center of Excellence, depending on the customer. In smaller organizations, an administrator computing device 102 may be used by a developer who wears the administrator "hat" periodically when interacting with infrastructure provisioning system 104. The administrator computing devices 102 can manage underlying infrastructure (network resources, third-party resources, self-hosted resources) that are shared by multiple applications and development teams (VPCs, elastic container service ("ECS") clusters, elastic Kubernetes service ("EKS") clusters). The administrator computing devices 102 can also manage the infrastructure as code and pipeline configurations used to provision and deploy applications in the organization. While an administrator may be subsequently referred to, it will be understood that reference to an administrator can include a reference to an administrator computing device associated with the administrator.

The administrator computing devices 102 may provide a self-service interface (e.g., via the infrastructure provisioning system 104) for configuring computing service infrastructure. For example, the administrator computing devices 102, via the infrastructure provisioning system 104, define the configurations, deploy shared underlying infrastructure, and define the input parameters available to developers to provision and deploy the applications. The infrastructure provisioning system 104 enables the administrator computing devices 102 to package and maintain input parameters and to provide an abstracted interface to developers.

The developer computing devices 106 may be used by or otherwise correspond to a developer persona or user, also referred to as a developer account. In some embodiments, a developer computing device 106 may provide the application code that is deployed (e.g., via the infrastructure provisioning system 104). For example, developers or other users of the developer computing devices 106 may manage the operational performance of the code running in the container image and can be paged for it, but are not responsible for engaging in any failures that occur outside the image (for example, issues in the configuration of networking or load balancers). While a "developer" may be subsequently referred to herein with respect to performance of various functions, it will be understood that a reference to a developer can include a reference to a developer computing device associated with the developer.

The infrastructure provisioning system 104 can deploy or otherwise provision the computing environment for an organization or other computing service development entity. For example, an organization may be associated with the developer computing devices 106 either locally (e.g., on-premises of the organization) or remotely (e.g., as remotely-access devices in a cloud computing environment). The infrastructure provisioning system 104 may provision the environment and/or individual computing services operating within the environment of the organization via a deployment pipeline. In some embodiments, the infrastructure provisioning system 104 may continuously deploy the environment such that the environment is periodically updated by the infrastructure provisioning system 104. The infrastructure provisioning system 104 can enable a developer to instantiate (e.g. "spin up") and manage a new application when it's needed. Administrator computing device 102 can define infrastructure configuration templates that include the entire application stack, including infrastructure, observability tools, a pipeline, and a source code repository. The infrastructure provisioning system 104 can deploy applications, including those running in containers, serverless functions, and the like.

In some embodiments, the deployment artifacts (container images, serverless function deployment packages such as Amazon Lambda packages, VM images such as Amazon Elastic Compute Cloud ("EC2") machine images) may be immutable, and an application may only be changed by deploying a new artifact. In these embodiments, when new application code needs to be deployed, it can be built into a new immutable deployment artifact and the new artifact may be deployed. The infrastructure provisioning system 104 can describe and deploy the full application (including infrastructure, deployment artifacts, and observability configuration like alerts) using infrastructure as code. Deployments of new artifacts go through the infrastructure provisioning system 104, and the infrastructure provisioning system 104 can deploy the new artifact using an infrastructure as code provider. The infrastructure provisioning system 104 can automatically ingest and test new or updated configurations. The infrastructure provisioning system 104 can provision a standardized CI/CD pipeline for developers (as defined by the administrators), and push changes to either the application code or application specification, and have it automatically deployed. Further, the infrastructure provisioning system 104 can enable observability tools. The observability tools may include metrics, logs, traces, and alerts defined through infrastructure as code. Such tools can define whether the application is "healthy" or not, and can provide a feedback loop to both developers and administrators about the success of both code changes and infrastructure as code changes that have been deployed.

At [A], an administrator computing device 102 generates the infrastructure template(s) for services and/or environments. An infrastructure template—also referred to simply as a template—defines a configuration for a cohesive set of infrastructure resources that may be replicated multiple times. Templates may contain configurable inputs. For example, a template may include a schema that defines input parameters for a service that a developer can provide, and an infrastructure as code definition for the resources that can be provisioned when the service is instantiated from the template. These infrastructure as code files can include data encoded in a templating language to facilitate injection of developer-specified input values for the schema at deployment time. In some embodiments, there may be multiple types of templates. For example, the templates may include environment templates and service templates.

Environment templates can specify infrastructure resources that are intended to be shared across multiple services. For example, environment templates may specify various combinations of VPCs, ECS/EKS clusters, and shared load balancers or databases. Environment templates can also define shared provisioning configuration like identity and access management ("IAM") roles, network accounts (for cross-account deployment), regions (for cross-region deployment), and third-party credentials (for deployment using third-party tools). Environment templates can be replicated multiple times with different inputs. For example, an administrator can choose to create single Development ("Dev"), Staging, and/or Production ("Prod") environments shared across the entire organization. As another example, environments or groups thereof may be created for various development teams, such as individual "Dev-TeamX," "Staging-TeamX," and "Prod-TeamX" environments for each development team.

Service templates can be logical resources that represent a computing service (e.g., an application or microservice) and its source code repository. Service templates can be deployed into one or more environments (for example, Dev, Staging, and Prod) by a CI/CD pipeline. Service templates can also be deployed into other environments outside of the production CI/CD pipeline, for example into developer sandbox environments and feature branch environments. Service templates can be used to specify the infrastructure resources for a particular service, and that service may be instantiated as one or more service instances, with different inputs (for example, different scaling dimensions in staging vs production). Service instances provision the resources defined in the Service's chosen template that are required to run the application, including compute, orchestration, scaling, observability, traffic routing, storage, and messaging. In some embodiments, a one to many relationship can exist between environments and service instances: multiple service instances across services can be deployed to an individual environment, and each service instance may only be deployed to one environment. The service specified by a particular service template may also contain a pipeline. The pipeline can build a new deployment artifact when a commit is pushed to the service's source code repository, and can deploy the artifact to one or more of the service instances. The infrastructure provisioning system 104 provisions any resources needed for the service's continuous deployment. This may result in one or more "pipeline" resources in a CI/CD provider, depending on how the administrator wants CI/CD orchestrated.

At [B], the administrator computing devices 102 provide the template(s) (e.g., makes them available to developer computing devices 106, the infrastructure provisioning system 104, etc.). The template(s) may include a schema and an infrastructure as code designations that specify how the developer-specified input values for the schema are to be injected into the infrastructure as code template. The schema defines the inputs for the template. The schema can be an "API model" or "interface contract" between administrators and developers, and defines the core of the abstraction presented to developers. For example, the schema can be an OpenAPI 3.0 data model schema. The schema can enable the generation of documentation and provision of custom APIs/command line interfaces ("CLIs")/software development kits ("SDKs") for customer-defined template schemas. Environment templates can require a single input schema for the environment. Service templates may require an input schema for the pipeline and another one for service instance inputs. In some embodiments, the schema file and infrastructure as code file with templating language instructions for a given template may be bundled into a combined data object (e.g., a single compressed archive, such as a zip or tar file) for transmission and/or storage. The combination of a schema file and infrastructure as code file with templating language instructions may be referred to as a "template bundle."

In some embodiments, to specify the resources that should be provisioned when a template is instantiated as a given service instance, administrators can use a templating language to specify how developer-specified input values are to be injected into the template bundle's infrastructure as code files, as well as injecting other properties like resource name, account ID, region, and (for service instances only) output values from the parent environment's stacks and/or workspaces.

The administrator may use a templating or translation language to specify how developer-specified values are to be injected into an infrastructure as code file. For example, the administrator may use Jinja as the templating language. At deployment time, the infrastructure provisioning system 104 can compile the Jinja template from the template bundle with the developer-specified input values to generate the infrastructure as code template that is used to deploy the service infrastructure. The language and format of the infrastructure as code file may depending on the infrastructure provisioning engine to be used by the infrastructure provisioning system 104. In some embodiments, the infrastructure as code file may be a CloudFormation or Terraform file. At deploy time, the infrastructure provisioning system 104 can generate an infrastructure as code file, such as a "tfvars" file if Terraform is used, with the provided input values.

Tables 1 and 2, below, show example environment template infrastructure as code snippets for a CloudFormation provisioning engine and a Terraform provisioning engine, respectively. The files include Jinja templating instructions in italics for injecting values specified according to a corresponding schema.

TABLE 1

```
# VPC environment template cloudformation.jinja snippet, injecting
# the subnet_cidr_blocks input
  Vpc:
    Type: AWS::EC2::VPC
    Properties:
      CidrBlock: "10.0.0.0/16"
{% for item in subnet_cidr_blocks %}
  Subnet{{ loop.index }}:
    Type: AWS::EC2::Subnet
    Properties:
      CidrBlock: {{ item }}
{% endfor %}
  Outputs:
    Vpc:
      Value: !Ref Vpc
{% for item in subnet_cidr_blocks %}
    SubnetId{{ loop.index }}:
      Value: !Ref Subnet{{ loop.index }}
{% endfor %}
```

TABLE 2

```
// VPC environment template vpc.tf Terraform snippet, injecting
// the subnet_cidr_blocks input
resource "aws_vpc" "myvpc" {
  cidr_block = "10.0.0.0/16"
}
output "vpc" {
  value = aws_vpc.myvpc.id
}
variable "subnet_cidr_blocks" {
  type    = list (string)
}
resource "aws_subnet" "mysubnets" {
  count = length(var.subnet_cidr_blocks)
  cidr_block = var.subnet_cidr_blocks[count.index]
}
output "subnet_ids" {
  value = aws_subnet.mysubnets[*].id
  description = "Array of subnet IDs"
}
```

Tables 3 and 4, below, show example service template infrastructure as code snippets for a service and corresponding pipeline, respectively. The files include Jinja templating instructions in italics for injecting values.

```
# APIService service template service_instance.cloudformation.
```

-continued

```
jinja snippet,
# injecting container_image input and output values from the
VPC environment
    TaskDef:
      Type: AWS::ECS::TaskDefinition
      Properties:
        ContainerDefinitions:
          - Image: {{ container image }}
   ...
    Service:
      Type: AWS::ECS::Service
      Properties:
        NetworkConfiguration:
        AwsvpcConfiguration:
          Subnets:
            - {{ env.SubnetId1 }}
          {% if env.SubnetId2 is defined %}
            - {{ env.SubnetId2 }}
          {% endif %}
          {% if env.SubnetId3 is defined %}
            - {{ env.SubnetId3 }}
          {% endif %}
```

TABLE 4

```
# APIService template pipeline.github_actions.jinja snippet, injecting
# service name, developer-provided stage definitions, unit test command.
# This pipeline builds a new image, pushes it to ECR, then
deploys the image
# to each service instance.
  - name: Login
    id: login-ecr
    uses: aws-actions/ecr-login@v1
  - name: Build, tag, and push image to ECR
    id: build-image
    env:
{% raw %}
        IMAGE_TAG: ${{ github.sha }}
        ECR_REGISTRY: ${{ steps.login-ecr.outputs.registry }}
{% endraw %}
        ECR_REPOSITORY: {{ service_name }}
    run: |
        docker build -f ./Dockerfile -t $ECR_REGISTRY/
        $ECR_REPOSITORY:$IMAGE_TAG docker push $ECR_REGISTRY/$ECR_REPOSITORY:
        $IMAGE_TAG
        echo "::set-output name=image::$ECR_REGISTRY/
        $ECR_REPOSITORY:$IMAGE_TAG"
        {{ unit_tests_command }}
{% for stage in stages %}
    # Deploy new image to {{ stage.name }} stage
  - name: Deploy to {{ stage.name }} instance
    env:
{% raw %}
        IMAGE: ${{ steps.build-image.outputs.image }}
{% endraw %}
    run: |
        aws update-service-instance --service
        {{ service_name }} --instance
{{ stage.service_instance }} --field container_image --value $IMAGE
        aws wait service-instance-deployed --service
        {{ service_name }} --instance
{{ stage.service_instance }}
{% endfor %}
```

In some embodiments, templates may be versioned using a versioning scheme that includes major and minor versions. An administrator may choose whether to create a new major or minor version for each new bundle. Major versions can represent changes to the template that will likely require developers to be involved in upgrading the service to a new major version, for example, by providing the value for a new required input in the schema or making a required code change like changing the port that the application will listen on. Such major version may not be backwards-compatible with prior major versions. Minor versions can represent small changes to the input schema (new optional fields) or to the template contents, such that administrators can upgrade services to a newer minor version without involving developers. The infrastructure provisioning system 104 can validate minor version registrations if no backward-incompatible changes have been made to the input schema (e.g. no new required inputs). As part of registering service major version templates, administrators may specify which environment major version templates are compatible with that service template.

At [C'], the admin computing device 102 specifies parameters of the environment to be deployed by providing values in accordance with the schema for the corresponding template. The administrator can specify inputs by creating specification data, such as a specification file (e.g., a YAML file that conforms to the OpenAPI data model schema for the chosen template), and providing the specification data to the API. The environment configuration can be updated by editing the file and providing the contents to the infrastructure provisioning system 104. In one example, a particular environment may use the latest major and minor version for a VPC template. The environment can be upgraded to a new major or minor version using the API. The IDs of the environment's stacks/workspaces and the output values for the environment can be queried via API.

At [C], a developer computing device 106 specifies parameters of the service to be deployed by providing values in accordance with the schema for the corresponding template. In some embodiments, a developer chooses a service template, chooses an environment that is compatible with that service template for each service instance to be instantiated, and creates a specification file for the service template's pipeline and service instance inputs. For example, the developer can specify inputs by creating specification data, such as a specification file (e.g., a YAML file that conforms to the OpenAPI data model schema for the chosen template), and providing the specification data to the API. The service configuration can be updated by editing the file and providing the contents to the infrastructure provisioning system 104. In one example, a particular service may use the latest major and minor version for a load balancer template. The service can be upgraded to a new major or minor version using the API.

At [D], the infrastructure provisioning system 104 processes the template(s). In some embodiments, the infrastructure provisioning system 104 may identify, in a template bundle 202, a schema file 204 indicating one or more fields for valid inputs to define an application or other service, and an infrastructure as code file 206 with templating instructions for injecting values that correspond to the schema 204. At [E], the infrastructure provisioning system 104 processes a specification file 208. The infrastructure provisioning system 104 may determine one or more values of the specification file 208 that correspond to the schema 204 of the template (e.g., parameters that help define an application stack), and inject those values into the infrastructure as code file to obtain a complete infrastructure as code file for provisioning a service. A detailed example of provisioning service infrastructure is shown in FIG. 2 and described in greater detail below.

Figure 3:
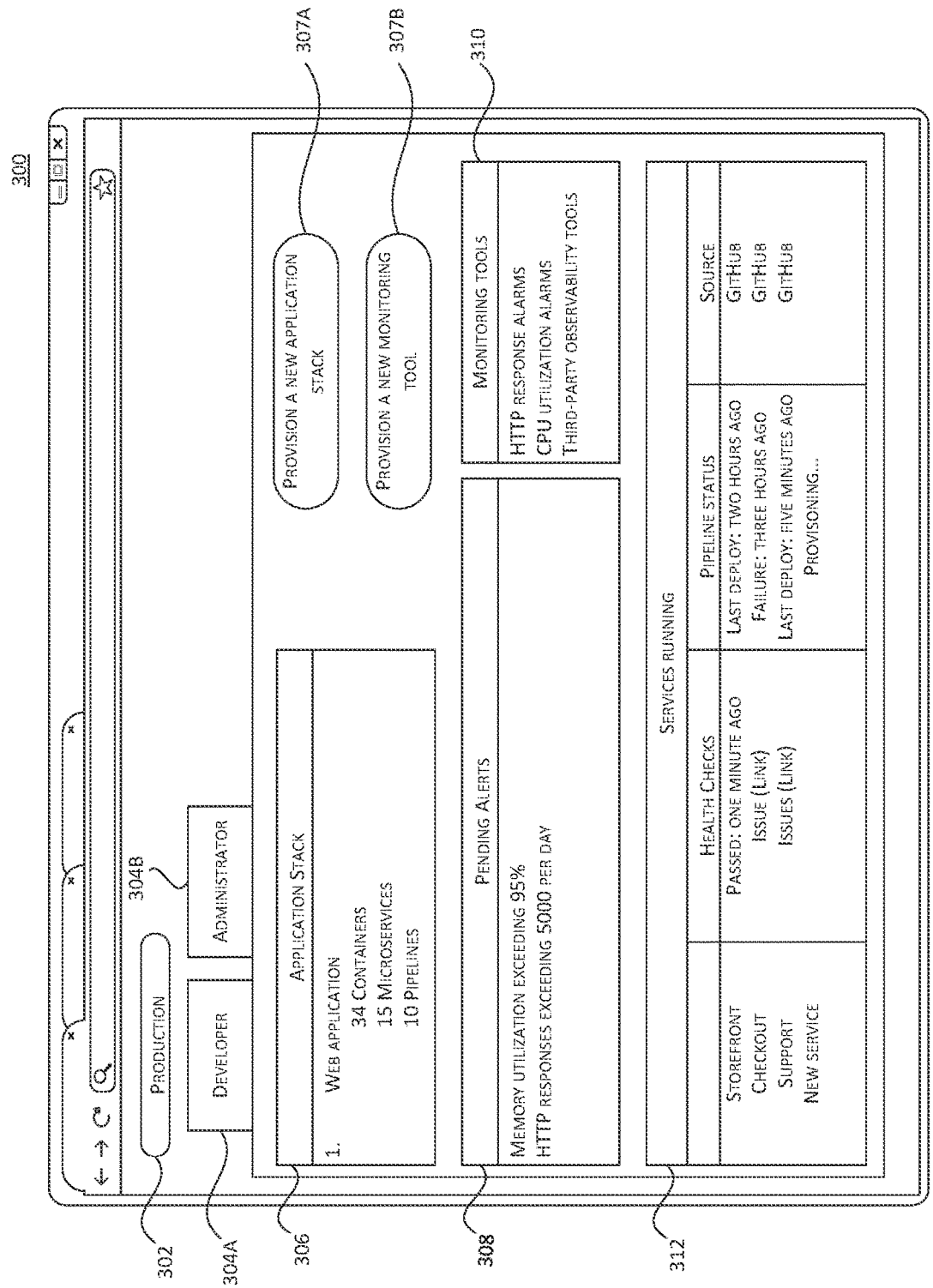
FIG. 3 depicts a diagram of a user interface presenting information and providing available operations associated with application stacks and monitoring tools in accordance with aspects of the present disclosure.

At [F], the infrastructure provisioning system 104 generates and provisions the instance of the application stack 212 or other computing service to a host computing system 210 based at least in part on the infrastructure as code file with data injected from the specification. Afterward, the developer can query the service and service instances to see the outputs of the provisioned stacks. To shield the developer from the low-level details and specifics of the provisioned resources, the infrastructure provisioning system 104 can generate and present high-level information to application developers. For example, the status of the pipeline (e.g. the last execution succeeded or failed) with a deep-link to the pipeline, the aggregated status of any alarms provisioned as part of each service instance's infrastructure stacks, and deep-links to any observability tool configured as part of each service instance's infrastructure stacks, including links to metrics, traces, alarms, and dashboards. For any deeper debugging needed beyond the service's logs, traces, and metrics (for example, looking at the provisioned ECS service directly), the stack identifiers and workspace IDs for the service are shown to the developer. A detailed example of an interface for information presentation and action initiation is shown in FIG. 3 and described in greater detail below.

When the administrator makes a minor change to an environment template or service template, the administrator can upload a new template bundle and register it as a new minor version in the infrastructure provisioning system 104. When there is a new major or minor version for a template, resources deployed from an older version of that template will show up as "out-of-date" in the infrastructure provisioning system 104, prompting either the administrator (for minor version updates) or the developer (for major version updates) to take action and upgrade the resource. Upgrading the resource compiles the infrastructure as code templates in the latest version's bundle with the current input values for the resource. The newly compiled templates are then provisioned, updating the stacks, workspaces, or workflow files in the source code repository.

Figure 2:
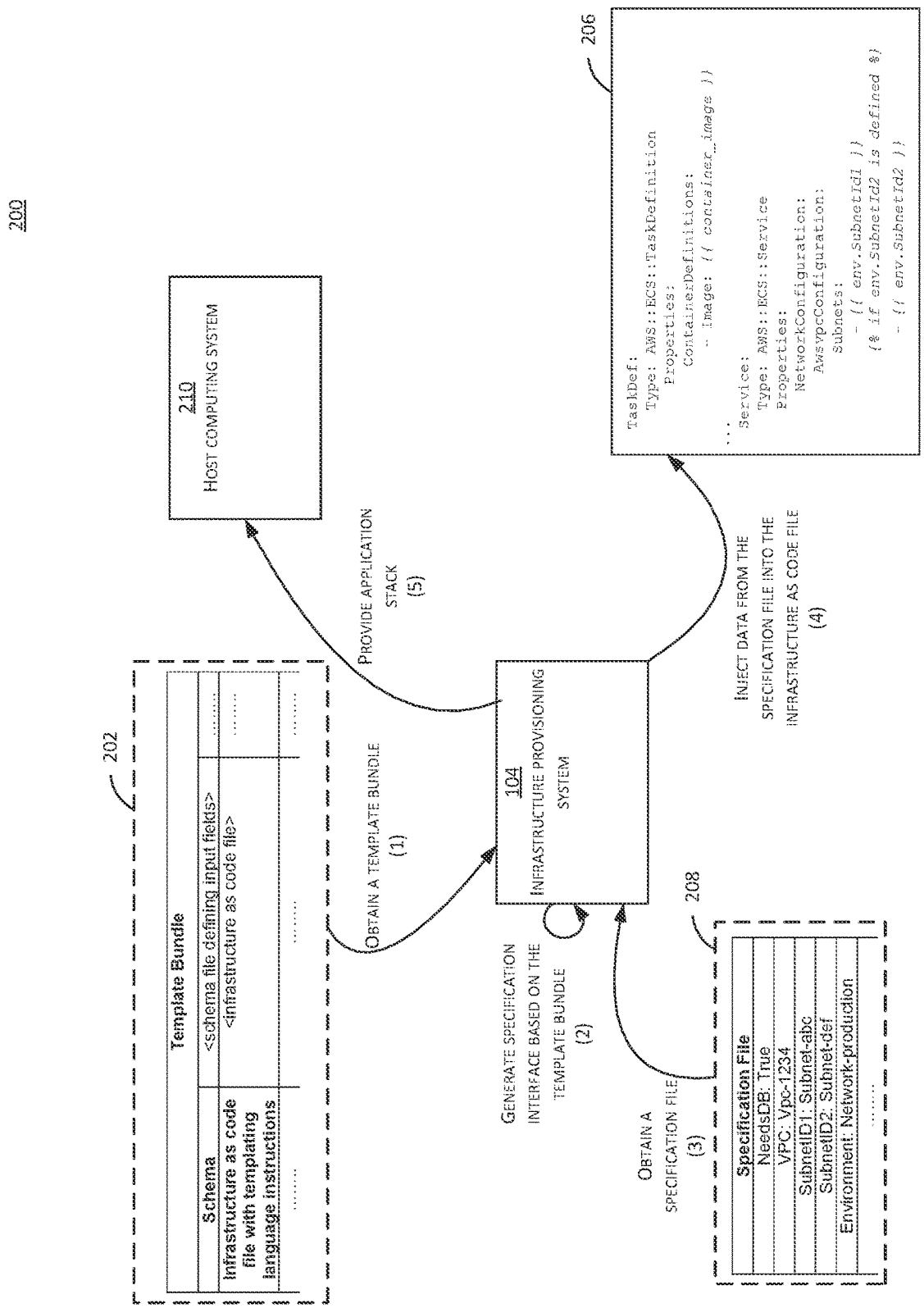
FIG. 2 depicts a schematic diagram showing configuration and provisioning of application infrastructure in an example networked environment according to some embodiments.

FIG. 2 depicts an example workflow 200 for an infrastructure provisioning system 104 provisioning an instance of an application stack in accordance with aspects of the present disclosure. The infrastructure provisioning system 104 may periodically provision instances of application stacks or update instances of application stacks or may be initiated to provision instances of application stacks based on one or more events (e.g., a user defined event such as an alert and/or an alarm). In some embodiments, the infrastructure provisioning system 104 provisions an instance of a service application stack and an instance of an environment within which application stacks and/or other services may be deployed.

As shown in FIG. 2 at (1), the infrastructure provisioning system 104 obtains a template bundle 202. The infrastructure provisioning system 104 may obtain the template bundle 202 from one or more administrator computing devices 102, from a data store where template bundles are stored, or from some other source. The template bundle 202 may include various parameters defining how an instance of the application stack is provisioned by the infrastructure provisioning system 104. In some embodiments, the template bundle 202 may define valid formats and/or inputs for the application stack. The template bundle 202 may include a schema 204, an infrastructure as code file 206 with templating language instructions, and/or some other translation tool for translating developer specifications and infrastructure templates into actionable infrastructure as code data. The administrator computing devices 102 may generate one or more of the schema 204 and/or the infrastructure as code 206 file with templating language instructions in order to provide the template bundle 202 to the infrastructure provisioning system 104. In the example of FIG. 2, the template bundle 202 includes template information objects "Schema," "Infrastructure as code file with templating language instructions." Further, each template information object is associated with a particular object source and/or destination. For example, object "Schema" is associated with value "<schema file defining input fields>," object "Infrastructure as code file with templating language instructions" is associated with value "<infrastructure as code file>." It will be understood that the template bundle 202 may include more, less, or different objects. In some embodiments, the template bundle 202 includes the schema and/or the infrastructure as code file. Further, the template bundle 202 may include and/or identify the plurality of infrastructure resources corresponding to the particular infrastructure. Based at least in part on receiving the template bundle 202, the infrastructure provisioning system 104 may obtain the schema and/or the infrastructure as code file.

At (2), the infrastructure provisioning system 104 generates a specification interface based on the template bundle. In some embodiments, the specification interface may correspond to one or more of an API, a website, a mobile device interface, or any other interface. The infrastructure provisioning system 104 may generate the specification interface by analyzing the schema to determine valid fields that are to be used to define the instance of the application stack. Based on identifying the valid fields from the schema, the infrastructure provisioning system 104 may provision the specification interface to receive the specification file (the specification file identifying values for the valid fields). One or more of administrator computing devices 102, developer computing devices 106, or any other devices may interact with the specification interface to provide the specification file to the infrastructure provisioning system 104. For example, the infrastructure provisioning system 104 may provision an API to receive the values for the valid fields from the developer computing devices 106.

At (3), the infrastructure provisioning system 104 obtains a specification file 208. The infrastructure provisioning system 104 may obtain the specification file 208 from one or more administrator computing devices 102, one or more developer computing devices 106, or from some other source. For example, the infrastructure provisioning system 104 may obtain a specification file from one or more administrator computing devices 102 to provision an instance of an environment. Further, the infrastructure provisioning system 104 may obtain a specification file from one or more developer computing devices 106 to provision an instance of a service application stack. In some embodiments, the infrastructure provisioning system 104 may obtain multiple specification files 208. For example, the infrastructure provisioning system 104 may obtain a first specification file 208 from the one or more administrator computing devices 102 and a second specification file 208 from the one or more developer computing devices 106. The specification file 208 may identify the values for the valid fields in order to define the instance of the application stack. In the example of FIG. 2, the infrastructure provisioning system 104 obtains a specification file 208 including values "NeedDB: True," "VPC: VPC-1234," "SubnetID1: Subnet-abc," "SubnetID2: Subnet-edf," and "Environment: Network-production." Each value may identify a value that the developer has provided, via the developer computing devices 106, to define the instance of the application stack. It will be understood that the specification file may include, more, less, or different values. Further, the specification file may include a different format. For example, the specification file may identify the values without identifying the fields. Further, the specification file may include a table of values of a particular instance of the application stack.

At (4), the infrastructure provisioning system 104 inject (e.g., add) the values of the specification file into the infrastructure as code file based on the templating language instructions (e.g., Jinja instructions) obtained from the developer computing devices 102. Based on the injecting the values of the specification file, the infrastructure provisioning system 104 may generate an updated infrastructure as code file 206. The updated infrastructure as code file 206 that includes developer-specified values may then be used as a template from which any number of instances of the application stack may be deployed without requiring further input from the developer, administrator, etc. In some embodiments, the infrastructure provisioning system 104 may validate the specification file 208 by using the schema 204 prior to injecting the values of the specification file 208 into the infrastructure as code file 206. In the example of FIG. 2, the updated infrastructure as code file 206 is shown in Table 5:

TABLE 5

TaskDef:
   Type: AWS::ECS::TaskDefinition
     Properties:
       ContainerDefinitions:
         - Image: {{ *container_image* }}
. . .
  Service:
   Type: AWS::ECS::Service
   Properties:
     NetworkConfiguration:
       AwsvpcConfiguration:
         Subnets:
           - {{ *env.SubnetId1* }}
         {% if env.SubnetId2 is defined %}
           - {{ *env.SubnetId2* }}

Values in italics represent values injected from the specification data. It will be understood that the updated infrastructure as code file 206 may include more, less, or different fields and/or values.

At (5), the infrastructure provisioning system provisions (e.g., deploys) the instance of the application stack to the host computing device 210. In some embodiments, the host computing system 210 can include one or more of a server, a node, data storage, a computing device, etc. By provisioning the instance of the application stack, the infrastructure provisioning system 104 may provision the applications stack infrastructure based on the infrastructure as code file 206. Based on receiving the instance of the application stack, the host computing system 210 may execute the application stack. In some embodiments, the host computing system 210 may provide access to the application stack to one or more computing devices.

FIG. 3 depicts an example interface 300 for managing one or more instances of the application stacks that are implemented by an infrastructure provisioning system. The example interface 300 is illustrative of an interface that the infrastructure provisioning system can generate or cause to be generated and presented to a user (e.g., an administrator, a developer, etc.) when interacting with the infrastructure provisioning system. The infrastructure provisioning system or another computing system may cause the example interface 300 to be presented to a user (e.g., an administrator, a developer, etc.) via a computing device (e.g., an administrator computing device, a developer computing device, etc.). In the example of FIG. 3, the interface 300 includes various areas that enable various functionality of the interface 300. For example, the interface 300 includes area 302 to identify an environment and/or an instance of the application stack is deployed, areas 304A and 304B to identify the different roles of users, area 306 to identify information associated with the current instance of the application stack, areas 307A and 307B to enable provisioning of instances of the application stacks and monitoring tools, area 308 to identify pending alerts, area 310 to identify monitoring tools, and area 312 to identify services running. As will be described in more detail below, the infrastructure provisioning system may present the information associated with the instance of the application stack so that the developer and/or the administrator can monitor the instance of the provision of the application stack. It will be understood that FIG. 3 is illustrative only, and an infrastructure provisioning system may offer any type of information about the application stacks implemented by the infrastructure provisioning system. In some embodiments, a single interface may not provide options for both administrators and developers; instead, developers and administrators may each access their own interfaces that include various areas to enable various functionality relevant to the respective user personas.

The interface 300 may include an area 302. The area may include an application stack identifier that may identify an environment and/or a service. The application stack identifier may identify a particular instance of the application stack and provide information about the particular instance of the application stack. The developer and/or the administrator may toggle between various application stacks using the area 302. For example, the developer and/or the administrator may interact with the interface 300 to select a first application stack and a second application stack by using the identifier of the area 302 to identify each application stack. The application stack identifier may correspond to any numerical, alphabetical, alphanumerical, or symbolical string. For example, the application stack identifier may correspond to the order of generation. For example, a first application stack requested by the developer may correspond to "Application stack #1" and a second application stack requested by the developer may correspond to "Application stack #2." In the example of FIG. 3, the area 302 identifies that the active application stack is "Production."

The interface 300 may further include areas 304A and 304B. The areas 304A and 304B may identify different roles associated with the infrastructure provisioning system. For example, a first area 304A may correspond to a developer role and a second area 304B may correspond to an administrator role. Each role may correspond to a different view and the interface 300 may enable different functionality based on the current role. A user may interact with the areas 304A and 304B to select a role for the user. In some embodiments, the user must provide some verification of the role of the user. For example, the user may provide a username and password to the infrastructure provisioning system. Further, the infrastructure provisioning system may use a whitelist or a black list to ensure that valid users are accessing the infrastructure provisioning system. In the example of FIG. 3, the area 304A identifies a developer role and the area 304B identifies an administrator role.

The interface 300 may further include an area 306. The interface 300 may further include an area 306. The area 306 identifies the instance of the application stack that is being implemented by the infrastructure provisioning system for a particular developer. In some embodiments, the area 306 may identify multiple application stacks for a particular developer. The infrastructure provisioning system may monitor the provision of the instance of the application stack and include details about the application stack and/or the provision of the instance of the application stack in the area

306. The area 306 may include multiple application stacks that each correspond to different features and/or applications. Further, the area 306 may identify information about the application stack. For example, the area 306 may identify one or more components, features, or resources associated with the application stack (e.g., services, containers, pipelines, etc.) Further, the area 306 may identify the type of application stack being implemented by the infrastructure provisioning system. In the example of FIG. 3, the area 306 includes the application stack associated with type "Web application" and resources "34 containers," "15 microservices," and "10 pipelines." It will be understood that the area 306 may include more, less, or different application stacks and may identify more, less, or different resources associated with the application stacks.

The interface 300 may further include areas 307A and 307B. The areas 307A and 307B may allow a developer and/or an administrator to provision new features. For example, the area 307A may enable a developer and/or an administrator to provision a new application stack and the area 307B may enable the developer and/or the administrator to provision a new monitoring tool. The areas 307A and 307B may be configured to receive one or more user inputs and, based on the user inputs, provision one or more of a new application stack and/or a monitoring tool. Based on the interaction with the areas 307A and 307B, a new area may be generated to receive additional input from the administrator and/or the developer. For example, to provision a new instance of the application stack, the infrastructure provisioning system may request a specification file from the developer and/or a schema and infrastructure as code file from the administrator. In some embodiments, the infrastructure provisioning system may request a new specification file from the developer and use the new specification file with a prior schema and/or a prior infrastructure as code file. In another example, to provision a new monitoring tool, the infrastructure provisioning system may request details about the monitoring tool from the developer and/or the administrator. Further, the infrastructure provisioning system may request the features, resources, components, that are to be monitored by the monitoring tools.

The interface 300 may further include an area 308. The area 308 identifies the pending alerts that are currently pending for a particular instance of the application stack. The infrastructure provisioning system may monitor the instance of the application stack using the monitoring tools and monitor a list of pending alerts. The list of pending alerts may correspond to multiple monitoring tools and/or multiple different issues and the infrastructure provisioning system may compile the pending alerts into a uniform format across the alerts. The area 308 may include information pertaining to the alerts. For example, the area 308 may identify the type of alert, the reason for the alert, the start of the alert, the status of the alert, a suggested response to the alert, a severity of the alert, etc. Further, the area 308 may identify the particular characteristic that caused the alert. In the example of FIG. 3, the area 308 includes the pending alerts "Memory utilization exceeding 95%" and "HTTP responses exceeding 5000 per day." It will be understood that the area 308 may include more, less, or different pending alerts.

The interface 300 may further include an area 310. The area 310 identifies the monitoring tools that have been instantiated for a particular instance of the application stack. The area 310 may identify one or more of the monitoring tools that are actively monitoring the instance of the application stack. For example, the area 310 may identify the monitoring tools that are actively monitoring the instance of the application stack. In some embodiments, the area 310 may identify the monitoring tools selected by one or more of the developer and/or the administrator. In other embodiments, the developer and/or the administrator may interact with the area 310 to select one or more monitoring tools for the instance of the application stack. For example, the area 310 may comprise a check box, a drop down menu, etc. that allows a user to select certain monitoring tools. The monitoring tools may include alarms, observability tools, pipelines etc. In the example of FIG. 3, the area 310 includes the monitoring tools "HTTP response alarms," "CPU utilization alarms," and "Third-party observability tools." It will be understood that the area 310 may include more, less, or different monitoring tools.

The interface 300 may further include an area 312. The area 312 identifies the services currently running that are associated with the instance of the application stack. The area 312 may identify information about the services that are currently running. The area 312 may identify a status or health of the services. For example, the area 312 may identify health checks, a pipeline status, a source, etc. It will be understood that the area 312 may include more, less, or different information about the services. The information about the services may be gathered using the monitoring tools provisioned for the instance of the application stack. The interface 300 may provide the area to developers and administrators in order to provide an update about the status of the instance of the application stack. In the example of FIG. 3, the area 312 includes the services "Storefront," "Checkout," "Support," and "New service." Further, each service is associated with "health checks," a "pipeline status," and a "source." The service "Storefront" is associated with the value "Passed: one minute ago" for the field "Health checks," the value "Last deploy: two hours ago" for the field "Pipeline status," and the value "GitHub" for the field "Source," the service "Checkout" is associated with the value "Issue(link)" for the field "Health checks," the value "Failure: three hours ago" for the field "Pipeline status," and the value "GitHub" for the field "Source," the service "Support" is associated with the value "Issues(link)" for the field "Health checks," the value "Last deploy: five minutes ago" for the field "Pipeline status," and the value "GitHub" for the field "Source," the service "New service" is associated with the value "Provisioning . . . " for each field. A value of "Provisioning . . . " may indicate that the infrastructure provisioning system is currently gathering data about a particular service. It will be understood that each service may include more, less or different services and more, less, or different information about each service.

Figure 4:
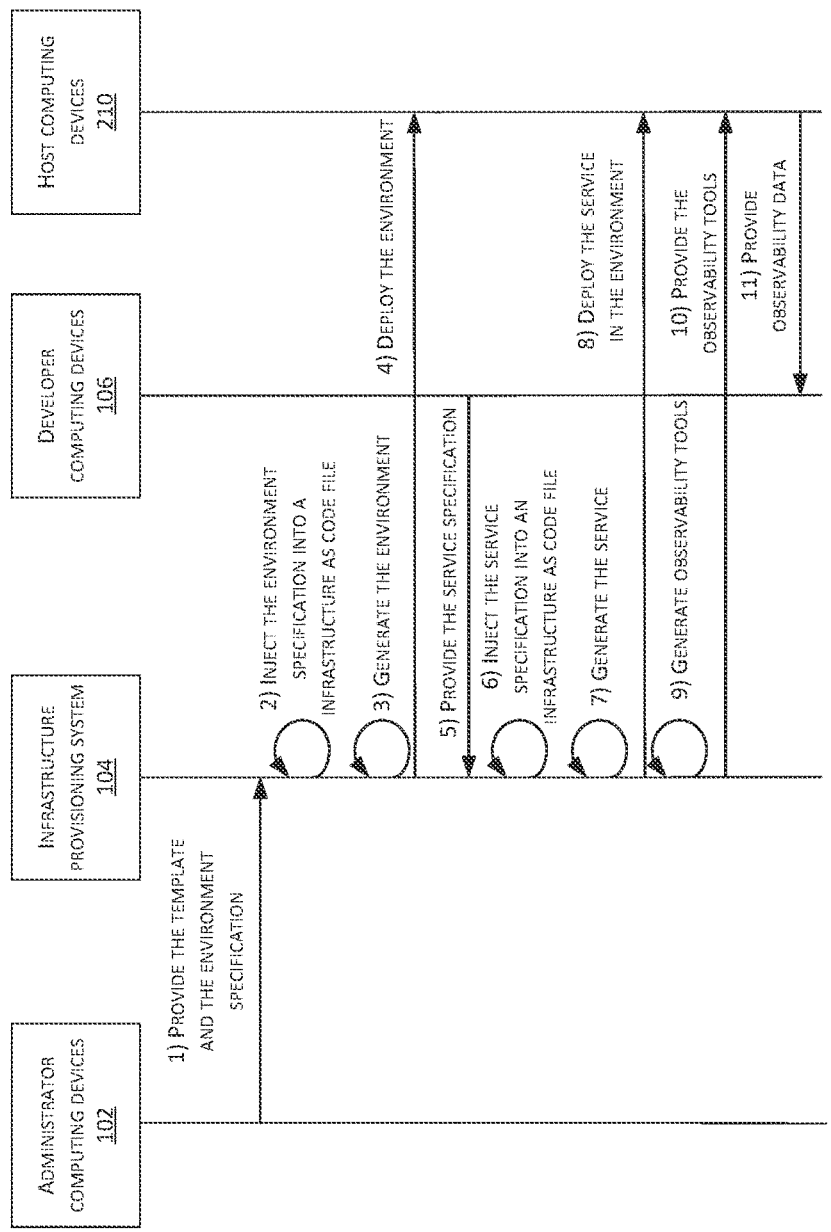
FIG. 4 depicts an example workflow for provisioning a service and an environment in an example networked environment.

FIG. 4 depicts interactions among various components shown in FIG. 1 for deploying an instance of a service application stack and an instance of an environment within which application stacks and/or other services may be deployed in accordance with aspects of the present disclosure. The networked environment 400 may include various components implemented in a networked configuration as identified in FIG. 1. The networked environment 400 may include one or more administrator computing devices 102, an infrastructure provisioning system 104, one or more developer computing devices 106, and one or more host computing devices 210. It will be understood that the networked environment 400 may include more, less, or different components.

As shown in FIG. 4 at (1), the administrator computing devices 102 provide a template to the infrastructure provisioning system. In some embodiments, the administrator computing devices 102 may provide a service template and/or an environment template. Each of the service template and the environment template may define a set of resources that will be replicated one or more times. Further, each template may identify, via a schema, valid objects (e.g., inputs) that can be used to define a corresponding set of infrastructure resources for an environment or application stack. Each template may identify an infrastructure code definition (e.g., an infrastructure as code file) for infrastructure resources provisioned with the application stack. For example, the template may include, define, or provide access to a translation tool indicating an infrastructure as code format. The service template may define logical resources that represent a given service and its source code repository. Each given service may be deployed into multiple environments. Further, a given service can be deployed in production environments, branch environments, production environments, etc. The environment template may define logical resources that are intended to be shared across multiple services. For example, the environment template may define virtual private clouds, load balancers, databases, etc. The environment template can further define shared provisioning configurations. The environment template may be replicated multiple times with different inputs. The administrator computing devices 102 may provide the service template and the environment template as a set of templates in order to deploy a corresponding service within a corresponding environment. In some embodiments, the administrator computing devices 102 may provide multiple service templates and/or multiple environment templates. The administrator computing devices 102 may further provide an environment specification file.

At (2), the infrastructure provisioning system 104 injects the specification from the administrator computing devices 102 (e.g., the environment specification) into an infrastructure as code file from the template. In some embodiments, the infrastructure provisioning system 104 may inject the specification from the administrator computing devices 102 into a first infrastructure as code file. The infrastructure provisioning system 104 may inject the specification file into the infrastructure as code file based on the templating rules provide in the template. The format of the infrastructure as code file may correspond to any code format.

At (3), the infrastructure provisioning system 104 generates the environment. The infrastructure provisioning system 104 may generate the environment based on injecting the environment specification into the infrastructure as code file. Further, in order to generate the environment, the infrastructure provisioning system 104 may generate or finalize the infrastructure as code that corresponds to the environment.

At (4), the infrastructure provisioning system 104 deploys the environment to host computing devices 210 for execution. The infrastructure provisioning system 104 can deploy the environment for an organization. In some embodiments, an organization may be associated with an organizational account to which one or more administrator accounts and/or developer accounts below. For example, the organization may be associated with the developer computing devices or with one or more users. The infrastructure provisioning system 104 may deploy the environment via a deployment pipeline. In some embodiments, the infrastructure provisioning system 104 may continuously deploy the environment such that the environment is periodically updated by the infrastructure provisioning system 104.

At (5), the developer computing devices provide the service specification file to the infrastructure provisioning system 104. The developer computing devices can specify the inputs into the application stacks based on the service specification file. The templates, via the schema, may indicate one or more objects to define the instance of the application stacks. The service specification file may define values that correspond to the one or more fields. Based on these values, the developer computing devices may therefore define the instance of the application stacks. For example, the service specification file may be a YAML file that conforms to the schema from the particular template. The service specification file may be provided in response to an API generated by the infrastructure provisioning system 104. For example, the infrastructure provisioning system 104 may generate the API based on the schema in order to receive the service specification file. In some embodiments, the developer computing devices may provide multiple service specification files. For example, a first service specification file may correspond to the service template and a second service specification file may correspond to the environment template. In some embodiments, an administrator may provide one or more of the specification files, such as a specification file corresponding to the environment template.

At (6), the infrastructure provisioning system 104 injects the specification from the developer computing devices 106 (e.g., the service specification) into an infrastructure as code file from the template. In some embodiments, the infrastructure provisioning system 104 may inject the specification from the developer computing devices 106 into a second infrastructure as code file. In other embodiments, the infrastructure provisioning system 104 may inject the specification from the developer computing devices 106 and the specification from the administrator computing devices 102 into the same infrastructure as code file. The infrastructure provisioning system 104 may inject the specification file into the infrastructure as code file based on the templating rules provide in the template. The format of the infrastructure as code file may correspond to any code format.

At (7), the infrastructure provisioning system 104 generates the service. The infrastructure provisioning system 104 may generate the service based on injecting the service specification into the infrastructure as code file. Further, in order to generate the service, the infrastructure provisioning system 104 may generate or finalize the infrastructure as code that corresponds to the service.

At (8), the infrastructure provisioning system 104 deploys the service in the environment via the host computing devices 210. The infrastructure provisioning system 104 can deploy the service to be implemented in a particular environment for a particular organization. For example, the organization may be associated with the developer computing devices or with one or more users. Further, the service may be assigned to the environment corresponding to the environment template provide with the service template. The infrastructure provisioning system 104 may deploy the service in the environment via a deployment pipeline. In some embodiments, the infrastructure provisioning system 104 may continuously deploy the service such that the service is periodically updated by the infrastructure provisioning system 104.

At (9), the infrastructure provisioning system 104 generates the observability tools. The infrastructure provisioning system 104 may determine, obtain, or otherwise identify observability tools to observe the behavior of the service and/or the environment. The observability tools may correspond to monitoring tools and/or pipelines (e.g., a CI/CD pipeline). The observability tools may be based at least in part on one or more of the template or the specification file.

At (10), the infrastructure provisioning system 104 provides the observability tools. The infrastructure provisioning system 104 may provide the observability tools to monitor the performance of the environment and/or the service. Further, the infrastructure provisioning system 104 may provide the observability tools by implementing code corresponding to the observability tools. For example, the infrastructure provisioning system 104 may insert code corresponding to the observability tools into the infrastructure as code corresponding to the service and/or the environment such that deployment of the service and/or the environment instantiates the observability tools. At (11), the host computing devices 210 provide observability data based on the observability tools to one or more of the developer computing devices 106, the infrastructure provisioning system 104, and/or the administrator computing devices 102.

Figure 5:
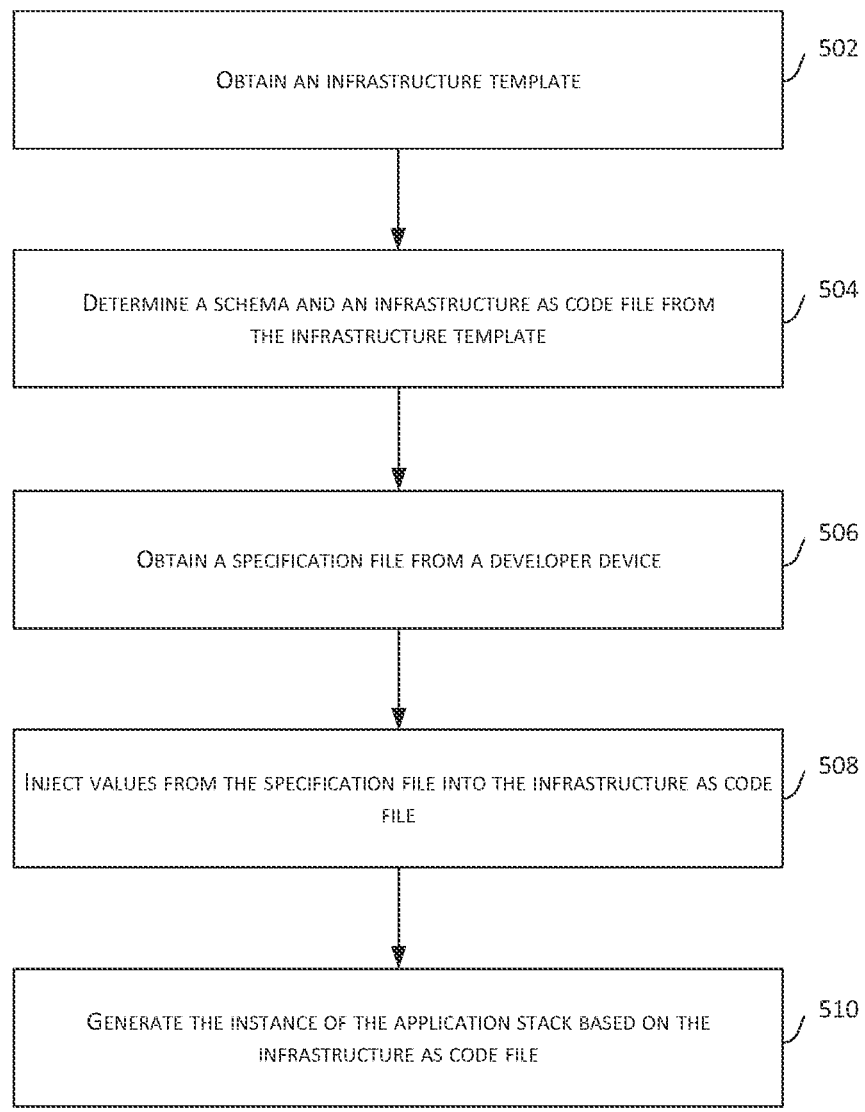
FIG. 5 is a flowchart of an example routine for provisioning an application stack.

FIG. 5 describes an illustrative process 500 for provisioning and deploying an instance of the application stack. The process 500 includes obtaining a schema and a specification file based on the schema in order to define the instance of the application stack. Further, the process 500 includes using a specification to inject values into an infrastructure as code file in order to provision the instance of the application stack. By using a schema and a specification in such a way, a comprehensive view of the instance of the application stack can be obtained.

The process 500 begins at block 502. The process 500 may begin automatically upon receiving a request to provision an application stack on a given set of infrastructure. For example, a developer may submit a request to implement an application stack on a given set of infrastructure. For example, a developer may generate an application stack and submit a request for the application stack to be implemented on the infrastructure. The process 500 may be embodied in a set of executable program instructions stored on a computer-readable medium, such as one or more disk drives, of a computing system of a node or a server. When the process 500 is initiated, the executable program instructions can be loaded into memory, such as RAM, and executed by one or more processors of a computing system. Upon initiation of the process, at block 502, a computing device executing the process 500 (e.g., the infrastructure provisioning system) may obtain an infrastructure template from one or more administrator computing devices. In some embodiments, the computing device executing the process 500 may be a translation engine. The infrastructure template may define a plurality of infrastructure resources. Further, the infrastructure template may point to a location of the plurality of infrastructure resources. For example, the infrastructure template may define the location of a block storage volume. The plurality of infrastructure resource may include environments that include resources shared across a plurality of services and/or services that include resources deployed in one or more environments. The infrastructure template may further include a schema and an infrastructure as code file (e.g., a translation tool) that can receive one or more values from a specification. In some embodiments, the infrastructure template may include one or more infrastructure as code files. For example, the infrastructure template may include multiple infrastructure as code files. Receiving the infrastructure template may include receiving an indication of one or more of the schema, the infrastructure as code file, or the plurality of infrastructure resources via one or more of a templating engine or an application programming interface. The plurality of infrastructure resources may further correspond to one or more infrastructure providers. In some embodiments, obtaining the infrastructure template may include registering the infrastructure template. In other embodiments, the computing device may provide the infrastructure template to a provisioning engine that provisions the infrastructure corresponding to the instance. For example, the computing device may include a provisioning engine that provisions the infrastructure.

At block 504, the computing device may determine the schema and the infrastructure as code file from the infrastructure template. The schema may identify one or more valid fields for one or more developer computing devices to define the instance of the application stack based at least in part on the infrastructure template. The infrastructure as code file may identify a valid format of the instance of the application stack. In some embodiments, the computing device can parse the schema to determine the valid fields and generate an API based at least in part on the valid fields. The API may cause the valid fields to be presented to a developer via the one or more developer computing devices.

At block 506, the computing device may obtain a specification file from the one or more developer computing devices. The specification file may include a plurality of field values. The plurality of field values may correspond to values that correspond to the one or more valid fields of the schema. In some embodiments, the plurality of field values are configuration parameters that correspond to a subset of the valid fields of the schema. The plurality of field values may define the instance of the application stack. In some embodiments, the computing device may validate the specification file by confirming that the plurality of field values corresponds to the one or more valid fields. The computing device may further obtain the specification file via the API.

At block 508, the computing device may inject values from the specification file into the infrastructure as code file (e.g., the computing device can translate the specification file and the schema using a translation tool to generate infrastructure as code). In order to translate the specification file and the schema, the computing device may combine the specification file and the schema based at least in part on the plurality of field values and the one or more valid fields. The computing device may translate, using the infrastructure as code file, the combination of the specification file and the schema to generate infrastructure as code corresponding to the valid format identified by the infrastructure as code file. In some embodiments, translating the specification file and the schema may be based at least in part on validating that the specification file by confirming that the plurality of field values corresponds to the one or more valid fields.

At block 510, the computing device can generate and/or provision the instance of the application stack corresponding to the infrastructure as code. The computing device can generate the instance of the application by executing the infrastructure as code. in some embodiments, the computing device may transmit the infrastructure as code to a different computing device for execution of the infrastructure as code and provisioning of the instance of the application stack. The instance of the application stack may correspond to a serverless and/or container-based application. Further, the computing device can deploy the instance of the application stack. In some embodiments, the computing device can deploy multiple instances of the application stack based on registering the template. For example, multiple users may each interact with a different instance of the application stack. In some embodiments, the computing device may obtain an updated infrastructure template. For example, the computing device may update the template to generate the updated template by updating one or more of the schema or the infrastructure as code file. Further, the computing device can determine that the instance of the application stack is misconfigured based at least in part on the updated template and modify one or more infrastructure resources of the plurality of infrastructure resources of the infrastructure template. Based on modifying the one or more infrastructure resources, the computing device can update the instance of the application stack based at least in part on the updated template and redeploy the instance of the application stack. The updated template may include a minor version based on input from the one or more administrator computing devices or a major version based on input from the one or more administrator computing devices and the one or more developer computing devices. In some embodiments, the computing device can deploy the instance of the application stack and monitor the health of the plurality of infrastructure resources. In order to monitor the health of the plurality of infrastructure resources, the computing device can determine one or more monitoring resources. For example, the one or more monitoring resources may include a CI/CD pipeline, observability tools, shared resources, or other monitoring tools. Based at least in part on monitoring the health of the plurality of infrastructure resources, the computing device can provide alert data to the one or more developer computing devices indicating a status of at least one of the plurality of infrastructure resources. In some embodiments, the alert data may include a deployment status, an upgrade status, a health status, or any other status of the instance of the application stack. In other embodiments, the computing device can provide the alert data to the one or more developer computing devices and/or the one or more administrator computing devices. Further, based on the alert data, the computing device can update the instance of the application stack and redeploy the instance of the application stack.

In some embodiments, the computing device can monitor the deployment of the instance of the application stack. Further, the deployment of the instance of the application stack may be a rolling deployment. The computing device can determine whether an alarm is triggered during deployment. For example, the computing device can determine that an alarm is not triggered during deployment and based on determining that the alarm is not triggered, finalize the deployment. In another example, the computing device can determine that an alarm is triggered during deployment and based on determining that the alarm is triggered, reverse the deployment.

Figure 6:
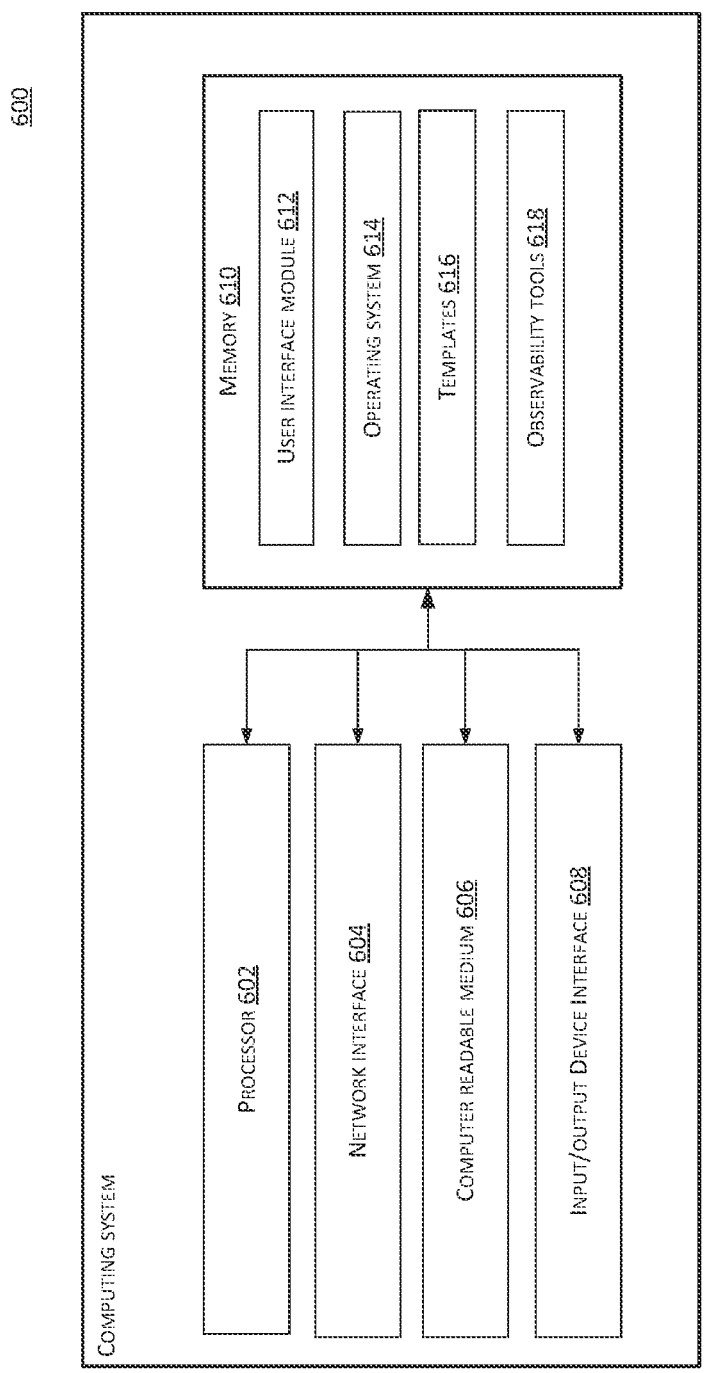
FIG. 6 shows an example computing device that may be used to implement aspects of the present disclosure.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an input/output ("IO") interface in communication with one or more microphones; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 may include session identifier information 614. As another example, the computer-readable memory 610 may include templates 616. Further, the computer readable memory 610 may include observability tools 618. In some embodiments, multiple computing systems 600 may communicate with each other via respective network interfaces 604, and can implement multiple sessions each session with a corresponding connection parameter (e.g., each computing system 600 may execute one or more separate instances of the processes 400), in parallel (e.g., each computing system 600 may execute a portion of a single instance of a process 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electronically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a plurality of host computing devices; and
   an infrastructure provisioning system comprising computer-readable memory and one or more processors configured to:
   obtain an infrastructure template bundle from an administrator account,
      wherein the infrastructure template bundle defines a plurality of infrastructure resources for application stacks, wherein individual infrastructure resources of the plurality of infrastructure resources correspond individual infrastructure providers of a plurality of infrastructure providers, and wherein the infrastructure template bundle comprises a schema and an infrastructure as code template with one or more translation instructions, and
      wherein the schema identifies one or more fields for defining an application stack to be generated from the infrastructure template bundle, and wherein the one or more translation instructions specify one or more operations for including data associated with the schema into an infrastructure as code file generated from the infrastructure template bundle;
   obtain a specification file from a developer account, wherein the administrator account and the developer account are both associated with a same organizational account, the specification file comprising one or more field values corresponding to the one or more fields of the schema;
   execute the one or more translation instructions to generate the infrastructure as code file from the specification file and the infrastructure template bundle;
   deploy, using the infrastructure as code file, an instance of the application stack comprising the plurality of infrastructure resources on a subset of the plurality of host computing devices;
   determine one or more monitoring resources to monitor the plurality of infrastructure resources;
   monitor, by the one or more monitoring resources, infrastructure provider-specific health data associated with the plurality of infrastructure resources; and provide infrastructure provider-independent data to the developer account based at least partly on the infrastructure provider-specific health data.

2. The system of claim 1, wherein the infrastructure provisioning system is further configured to obtain, from the administrator account, an environment template defining a second plurality of infrastructure resources for a computing environment in which application stacks are instantiated, wherein the infrastructure as code file is generated based at least partly on the environment template.

3. The system of claim 1, wherein the infrastructure provisioning system is further configured to:
   obtain an updated infrastructure template bundle from the administrator account, wherein the updated infrastructure template bundle comprises a second schema and a second infrastructure as code template;
   determine a difference between the updated infrastructure template bundle and the infrastructure template bundle; and
   based at least in part on determining the difference, deploy a second instance of the application stack using the updated infrastructure template bundle and at least one of the specification file or a second specification file.

4. The system of claim 3, wherein the infrastructure provisioning system is further configured to:
   determine that the difference between the updated infrastructure template bundle and the infrastructure template bundle requires updated developer input; and
   obtain the second specification file from the developer account.

5. A computer-implemented method comprising:
   under control of a computing system comprising one or more processors configured to execute specific instructions,
      obtaining a template from a first computing device, wherein the template defines a plurality of infrastructure resources for computing services, wherein the template comprises a schema and a translation tool, and wherein the schema identifies one or more fields for defining a computing service based at least in part on the template;
      obtaining specification data from a second computing device, the specification data associated with a computing service to be generated using the template, wherein the specification data comprises a field value corresponding to a field of the schema;
      generating infrastructure as code data using the translation tool and the specification data; and
      deploying an instance of the computing service using the infrastructure as code data.

6. The computer-implemented method of claim 5, further comprising extracting the translation tool from the template, wherein the translation tool comprises an infrastructure as code file with one or more translation instructions, and wherein a translation instruction specifies an operation for including a portion of the schema into the infrastructure as code data.

7. The computer-implemented method of claim 5, further comprising:
   receiving an updated template, wherein the updated template comprises a second schema and a second translation tool, and wherein at least a portion of the updated template is different than the template; and
   generating updated infrastructure as code data using the second translation tool.

8. The computer-implemented method of claim 7, further comprising determining a version of the updated template, wherein the version comprises one of:
   a minor version, wherein generating the updated infrastructure as code data using the second translation tool is based on the specification data; or
   a major version, wherein generating the updated infrastructure as code data using the second translation tool is based on updated specification data obtained from a developer computing device.

9. The computer-implemented method of claim 7, wherein generating the updated infrastructure as code data using the second translation tool is performed using the specification data, without requiring updated specification data.

10. The computer-implemented method of claim 5, further comprising:
    determining one or more monitoring resources, wherein the one or more monitoring resources comprise an observability tool or a shared resource;
    monitoring, by the one or more monitoring resources, a health of one or more infrastructure resources of the plurality of infrastructure resources; and
    based at least in part on monitoring the health of the one or more infrastructure resources, providing an alert indicating a status of the one or more infrastructure resources.

11. The computer-implemented method of claim 5, further comprising:
    monitoring deployment of the instance of the computing service, wherein the deployment of the instance of the computing service is a rolling deployment;
    determining that an alarm is triggered by the deployment of the instance of the computing service; and
    based at least in part on determining that the alarm is triggered, reversing the deployment of the instance of the computing service.

12. The computer-implemented method of claim 5, further comprising providing, to at least one of the first computing device or the second computing device, a health indication of the instance of the computing service, wherein the health indication comprises:
    a deployment status of the instance of the computing service;
    an upgrade status of the instance of the computing service; or
    a health status of the instance of the computing service.

13. The computer-implemented method of claim 5, further comprising:
    registering the template as available for deployment;
    receiving, from a developer computing device, a request to deploy a plurality of instances of the computing service; and
    deploying the plurality of instances of the computing service using the infrastructure as code data.

14. The computer-implemented method of claim 5, further comprising receiving an environment template from the first computing device, wherein the environment template defines a set of infrastructure resources shared across a plurality of computing services, and wherein generating the infrastructure as code data is based at least partly on the environment template.

15. The computer-implemented method of claim 5, further comprising:
    parsing the schema to determine the one or more fields;
    generating an application programming interface based at least in part on the one or more fields, wherein the application programming interface presents one or more inputs corresponding to the one or more fields via the second computing device; and obtaining the specification data via the application programming interface.

16. The computer-implemented method of claim 5, wherein deploying the instance of the computing service comprises deploying an instance of a serverless application or a container-based application.

17. A system comprising a plurality of computing devices, wherein each computing device of the plurality of computing devices comprises one or more processors and computer-readable memory, and wherein a first computing device of the plurality of computing devices is configured to:

obtain a template from a second computing device of the plurality of computing devices, wherein the template defines a plurality of infrastructure resources for computing services, wherein the template comprises a schema and a translation tool, and wherein the schema identifies one or more fields for defining a computing service based at least in part on the template;

obtain specification data from a third computing device of the plurality of computing devices, the specification data associated with a computing service to be generated using the template, wherein the specification data comprises a field value corresponding to a field of the schema;

generate infrastructure as code data using the translation tool and the specification data; and deploy an instance of the computing service to a subset of the plurality of computing devices using the infrastructure as code data.

18. The system of claim 17, wherein the first computing device is further configured to extract the translation tool from the template, wherein the translation tool comprises an infrastructure as code file with one or more translation instructions, and wherein a translation instruction specifies an operation for including a portion of the schema into the infrastructure as code data.

19. The system of claim 17, wherein the first computing device is further configured to:

receive an updated template, wherein the updated template comprises a second schema and a second translation tool, and wherein at least a portion of the updated template is different than the template; and generate updated infrastructure as code data using the second translation tool.

20. The system of claim 17, wherein the first computing device is further configured to:

determine one or more monitoring resources, wherein the one or more monitoring resources comprise an observability tool or a shared resource;

monitor, by the one or more monitoring resources, a health of one or more infrastructure resources of the plurality of infrastructure resources; and based at least in part on monitoring the health of the one or more infrastructure resources, provide an alert indicating a status of the one or more infrastructure resources.

* * * * *